(12) United States Patent
Chrisp

(10) Patent No.: US 8,339,600 B2
(45) Date of Patent: Dec. 25, 2012

(54) DUAL WAVEBAND COMPACT CATADIOPTRIC IMAGING SPECTROMETER

(75) Inventor: Michael P. Chrisp, Danville, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 356 days.

(21) Appl. No.: 12/829,816

(22) Filed: Jul. 2, 2010

(65) Prior Publication Data

US 2012/0002202 A1 Jan. 5, 2012

(51) Int. Cl.
*G01J 3/28* (2006.01)
(52) U.S. Cl. ........................................ 356/328
(58) Field of Classification Search .............. 356/328, 356/326, 334
See application file for complete search history.

(56) References Cited

U.S. PATENT DOCUMENTS

| | | |
|---|---|---|
| 5,717,487 A | 2/1998 | Davies |
| 5,880,834 A | 3/1999 | Chrisp |
| 6,078,048 A | 6/2000 | Stevens et al. |
| 7,414,719 B2 | 8/2008 | Chrisp |
| 2002/0135770 A1 | 9/2002 | Lewis et al. |
| 2008/0273244 A1* | 11/2008 | Oskotsky et al. ............. 359/558 |

* cited by examiner

*Primary Examiner* — Tarifur Chowdhury
*Assistant Examiner* — Abdullahi Nur
(74) *Attorney, Agent, or Firm* — Eddie E. Scott

(57) ABSTRACT

A catadioptric dual waveband imaging spectrometer that covers the visible through short-wave infrared, and the midwave infrared spectral regions, dispersing the visible through short-wave infrared with a zinc selenide grating and midwave infrared with a sapphire prism. The grating and prism are at the cold stop position, enabling the pupil to be split between them. The spectra for both wavebands are focused onto the relevant sections of a single dual waveband detector. Spatial keystone distortion is controlled to less than one tenth of a pixel over the full wavelength range, facilitating the matching of the spectra in the midwave infrared with the shorter wavelength region.

6 Claims, 6 Drawing Sheets

DUAL WAVEBAND COMPACT CATADIOPTRIC IMAGING SPECTROMETER

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

CROSS-REFERENCE TO RELATED APPLICATIONS

The invention in this application is related to inventions disclosed and claimed in U.S. Pat. No. 7,016,037 issued Mar. 21, 2006 to Michael P. Chrisp et. al. for an Imaging Spectrometer Utilizing Immersed Gratings with Accessible Entrance Slit. The disclosure of U.S. Pat. No. 7,016,037 is incorporated herein in its entirety for all purposes. The invention in this application is also related to inventions disclosed and claimed in U.S. Pat. No. 7,414,719 issued Aug. 19, 2008 to Michael P. Chrisp for an Imaging Spectrometer Wide Field Catadioptric Design. The disclosure of U.S. Pat. No. 7,414,719 is incorporated herein in its entirety for all purposes.

BACKGROUND

1. Field of Endeavor

The present invention relates to an imaging spectrometer, and more to an arrangement of optical elements to provide a dual waveband imaging spectrometer, in this case covering the visible through short wave infrared and the midwave infrared in one instrument.

2. State of Technology

U.S. Pat. No. 5,717,487 provides the following state of technology information: "A spectrometer is a known instrument for examining the spectral characteristics of light. Light emitted from or reflected by an object is received within the spectrometer and separated into its spectral components, such as the red, green and blue colored spectra as occurs in equal intensity when standard white light is so analyzed. The intensity of each such spectral component of that received light may be readily observed and measured. Each element of nature, molecular components, organic and inorganic compounds, living plants, man, animal and other substances is known to emit a unique spectrum that may be used as an indicium to identify the emitter." The disclosure of U.S. Pat. No. 5,717,487 is incorporated herein in its entirety for all purposes.

United States Patent Application No. 2002/0135770 published Sep. 26, 2003 provides the following state of technology information: "Imaging spectrometers have been applied to a variety of disciplines, such as the detection of defects in industrial processes, satellite imaging, and laboratory research. These instruments detect radiation from a sample and process the resulting signal to obtain and present an image of the sample that includes spectral and chemical information about the sample." The disclosure of United States Patent Application No. 2002/0135770 is incorporated herein in its entirety for all purposes.

U.S. Pat. No. 6,078,048 provides the following state of technology information: "In recent years substantial effort has been directed to the problem of detection of airborne chemicals. The remote detection of airborne chemicals issuing from exhaust stacks, vehicle exhaust, and various exhaust flumes or plumes, offers a non-intrusive means for detecting, monitoring, and attributing pollution source terms. To detect, identify, and quantify a chemical effluent, it is highly desirable to operate at the limiting spectral resolution set by atmospheric pressure broadening at approximately $0.1$ $cm^{-1}$. This provides for maximum sensitivity to simple molecules with the narrowest spectral features, allows for corrections for the presence of atmospheric constituents, maximizing species selectivity, and provides greater opportunity to detect unanticipated species." The disclosure of U.S. Pat. No. 6,078,048 is incorporated herein in its entirety for all purposes.

U.S. Pat. No. 5,880,834 provides the following state of technology information: "There are three problems in designing an imaging spectrometer where light in a slice of an image field passing through an entrance slit is to be diffracted by a grating parallel to the slit and imaged onto a focal plane for display or recording with good spatial resolution parallel to the slit and good spectral resolution perpendicular to the slit: 1. Eliminating astigmatism over the spectrum on the image plane. 2. Removing field curvature from the spectrum focused onto the image plane. 3. Obtaining good spatial resolution of the entrance slit which involves eliminating astigmatism at different field angles from points on the entrance slit." The disclosure of U.S. Pat. No. 5,880,834 is incorporated herein in its entirety for all purposes.

U.S. Pat. No. 7,414,719 for an imaging spectrometer wide field catadioptric design issued to Michael P. Chrisp Aug. 19, 2008 provides the following state of technology information: "The present invention provides a compact imaging spectrometer with an immersive or reflective diffraction grating that compensates optical distortions. The imaging spectrometer comprises an entrance slit for transmitting light, a system with a catadioptric lens and a dioptric lens for receiving the light and directing the light, an immersion grating, and a detector array. The entrance slit, the system for receiving the light, the immersion grating, and the detector array are positioned wherein the entrance slit transmits light to the system for receiving the light and the system for receiving the light directs the light to the immersion grating and the immersion grating receives the light and directs the light through the system for receiving the light to the detector array. The compact imaging spectrometer uses smaller cryogenic coolers facilitating its using in portable (man carried) gas detection systems and in small unmanned aerial vehicles for remote gas detection. These instruments have application for Homeland Defense to check for the presence of biological or chemical weapons without entering the contaminated areas. These instruments can be used for pollution detection, and remote sensing of agricultural crops, and geological identification. They can also be used for the remote monitoring of industrial processes. The wider field of view of this design enables larger swath widths for the remote sensing of larger areas with single pass overflights and is extensible to take advantage of larger format or mosaiced infrared detector arrays." The disclosure of U.S. Pat. No. 7,414,719 is incorporated herein in its entirety for all purposes.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention is a dual waveband imaging spectrometer including an entrance slit for transmitting light, a first dioptric lens, a mirror, a dispersing prism with a reflective coating, an immersion grating with a reflective coating, a second dioptric lens, and a dual waveband detector; the entrance slit, the first dioptric lens, the mirror, the dispersion prism, the immersion grating, the second dioptric lens, and the detector array positioned wherein the entrance slit transmits light to the first dioptric lens, which refracts light to the mirror, which reflects light back through the first dioptric lens to the dispersing prism and the immersion grating, from which the dispersed dual waveband light is focused through the first dioptric lens and the second dioptric lens to the dual waveband detector. In other embodiments, the present invention provides a modification of the dual waveband imaging spectrometer wherein the dispersing prism is replaced by a second immersion grating or whereby the immersion grating is replaced by a second dispersing prism. In yet other embodiments the present invention provides a modification of the dual waveband imaging spectrometer wherein the mirror is eliminated by changing the first dioptric lens into a catadioptric lens, with top part of its back surface covered with a reflective coating. The dispersed light would then go through the lower uncoated part of the catadioptric lens onto the second dioptric lens, and then onto the detector.

The present invention provides a dual waveband imaging spectrometer covering the visible through short-wavelength infrared, and the mid-wavelength infrared spectral regions. This compact catadioptric design has two dispersive elements: a zinc selenide grating for the visible through short-wavelength infrared, and a sapphire prism for the mid-wavelength infrared region. The pupil is split between the grating and the prism, with the relative areas chosen to match the number of photons in the different spectral regions with the pixel well sizes. The grating and prism are at the cold stop position, where there is a real aperture stop. The spatial keystone distortion is controlled to less than one tenth of a pixel over the full wavelength range from the visible through mid-wavelength infrared, and the spectral smile is kept to less than one tenth of a pixel over the wavelength range. The low spatial distortion means that the spectral information from a pixel on the ground is dispersed over a single column of pixels, providing simultaneous correlated spectral information without the need to resample.

The invention in this application has new improved designs, with the single waveband coverage extended to a dual waveband coverage, compared with U.S. Pat. No. 7,414, 719. The disclosure of U.S. Pat. No. 7,414,719 is incorporated herein in its entirety for all purposes.

The invention in this application provides a dual waveband compact imaging spectrometer design with complete wavelength coverage, in a single spectrometer system; whereas, in the past this required two separate spectrometers. This compact design, with a single small cryocooler, facilitates its use in small, medium, and large manned and unmanned aerial vehicles for remote solids identification and gas detection with characteristic spectral features in the visible/short-wavelength infrared and mid-wavelength infrared regions. This instrument has applications for Homeland Defense and environmental monitoring.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
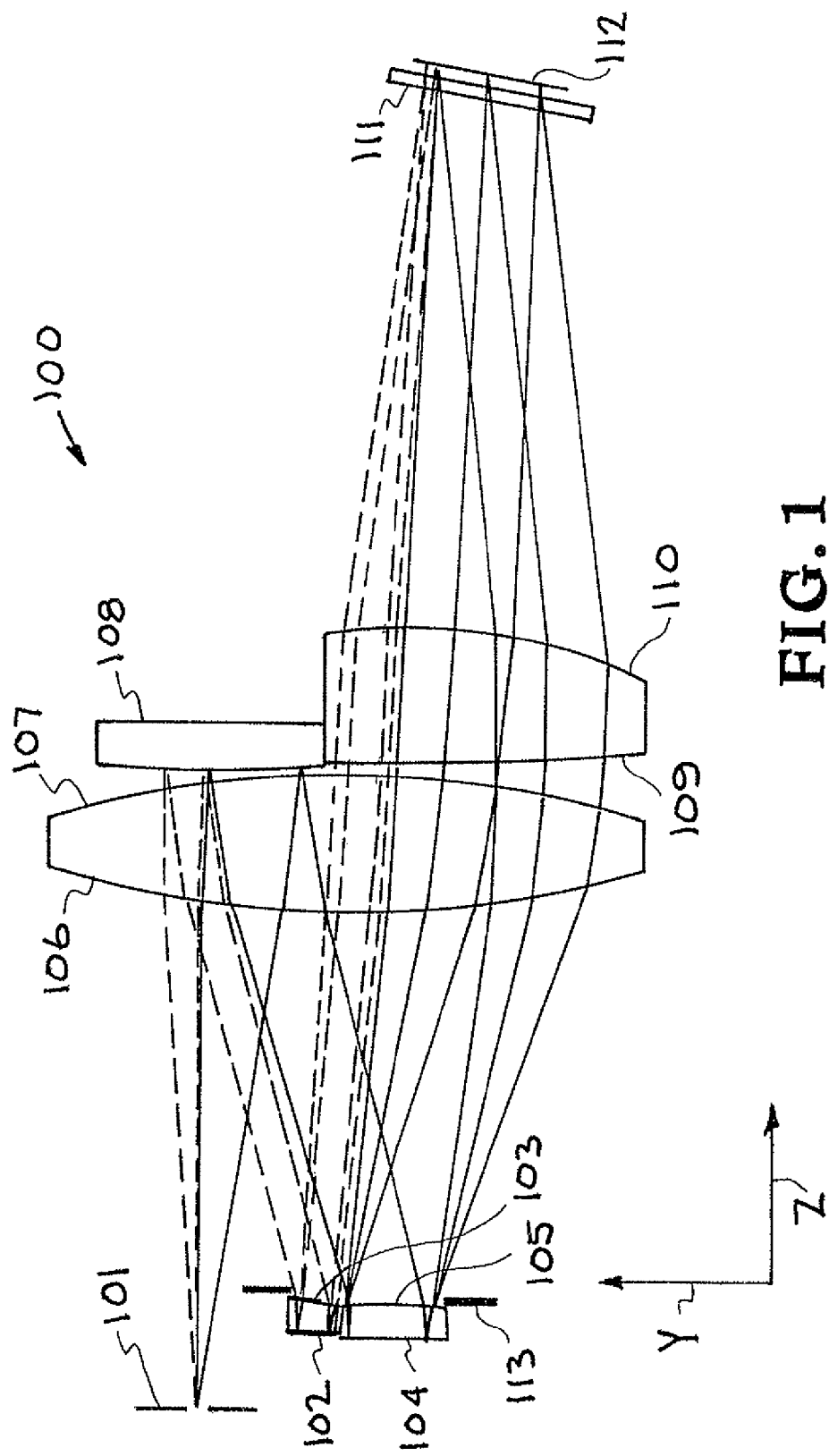
FIG. 1 illustrates an embodiment of a dual waveband imaging spectrometer constructed in accordance with the present invention with the visible through shortwave infrared and the midwave infrared being dispersed and focused on the relevant parts of the detector with the dual waveband response.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims. This invention can be adapted to different spectral regions by suitable choice of refractive and reflective materials, and with different detector arrays.

This dual waveband spectrometer was developed to take full advantage of dual wavelength detectors that have been developed with Vis/NIR/SWIR and MWIR sections on the same detector chip. The spectrometer provides simultaneous spectral information for each pixel on the ground through the Vis/NIR/SWIR and the MWIR atmospheric transmission bands. Previously this had required separate Vis/NIR/SWIR and MWIR spectrometers; however, there were problems of matching their alignment, their ground sample distance and synchronizing their exposures. In practice, it has been very difficult to obtain simultaneous spectra in the visible and MWIR for the same ground footprint. Also, in small aerial vehicles, there is often not enough room for two separate spectrometer systems with their associated cooling systems.

The design presented here, takes full advantage of the dual waveband detector and provides simultaneous Vis/NIR/SWIR and MWIR spectral wavelength information. The spatial keystone and spectral smile have been controlled over the full wavelength range, to ensure the purity of the spectral data received from the ground footprints which facilitates the accuracy of the spectral matching algorithms.

Figure 2:
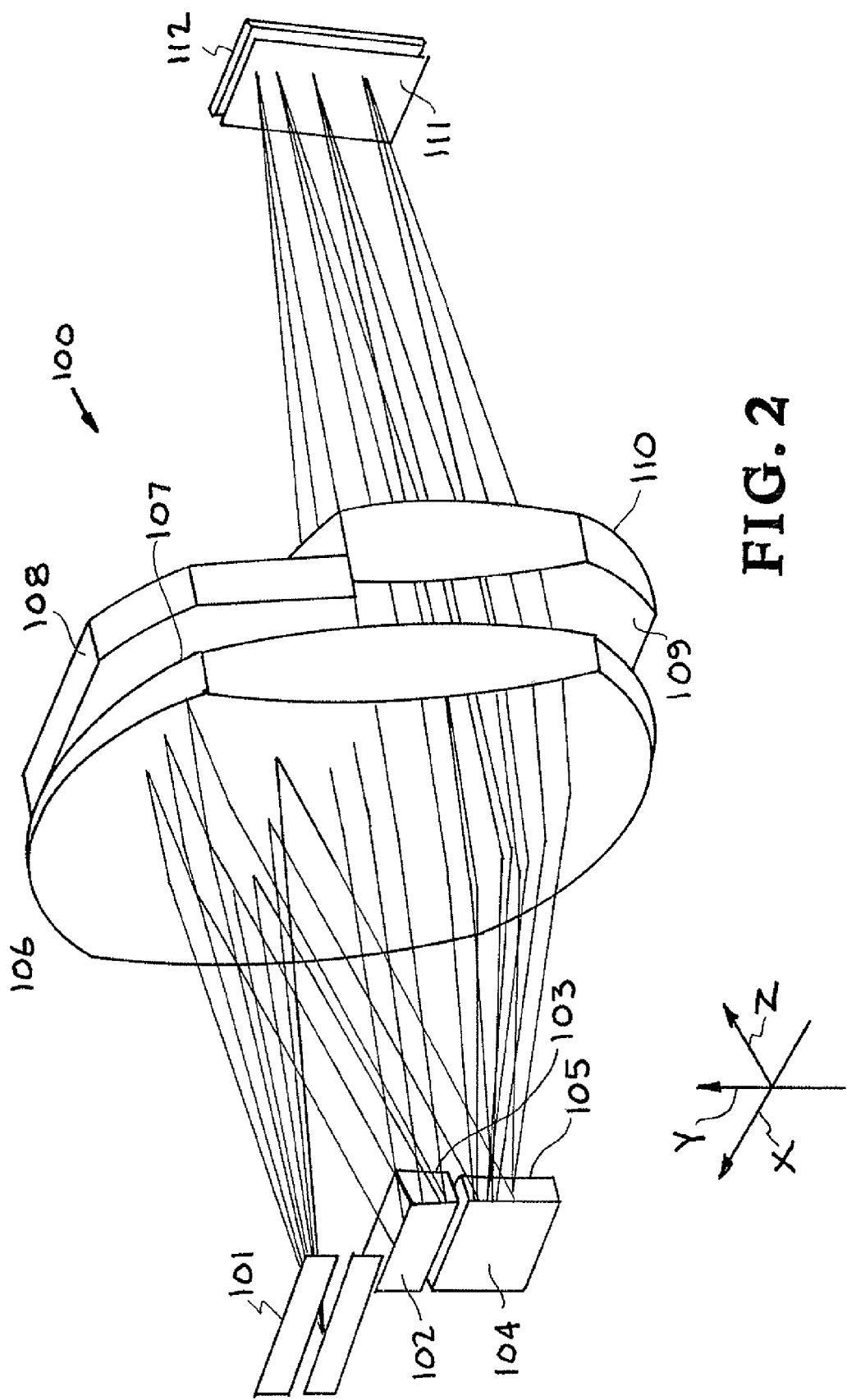
FIG. 2 illustrates a perspective view of the embodiment of the dual waveband imaging spectrometer.

Referring now to the drawings and in particular to FIG. 1 and FIG. 2, one particular embodiment is shown of a dual waveband imaging spectrometer constructed in accordance with the present invention with the visible through shortwave infrared and the midwave infrared being focused on the relevant parts of the detector with the dual waveband response. The optical design takes advantage of a dual waveband detector, with 28 rows of pixels sensitive for MWIR detection, and with the rest of the rows for detecting the visible through SWIR. The light is dispersed by the prism and grating along the Y axis, with the spatial information resolved at the different wavelengths along the X axis.

The light travels from the entrance slit (101) of the spectrometer to the first barium fluoride dioptric lens refracting through the front (106) and back (107) of the lens, then reflecting from the curved mirror (108) behind the lens, so that the light traverses back through the lens. The light then travels to the zinc selenide grating (104,105) and the sapphire prism (102,103), with the cold stop (113) in the design just in front of these two optical elements. The cold stop (113) ensures that the warm back radiation from outside the spectrometer entrance slit does not reach the detector array, which would cause an unacceptable degradation in the signal to noise ratio.

The sapphire prism (102,103) disperses the MWIR onto the 28 MWIR sensitive detector rows, and has the advantage that no stray diffraction orders need to be controlled. The light enters through the curved surface at the front (103) of the prism, is transmitted through the sapphire and then reflected off the coated back surface (102), back through the sapphire and out through the curved front surface (103). This prism has both curved front and back surfaces, enabling the prism to perform three functions: disperse the MWIR radiation, form an achromatic system with the two barium fluoride lenses (106,107 and 109,110) which corrects most of the MWIR longitudinal chromatic defocus, and provide the correct power so that the focus of the MWIR rays lies on the same plane as the Vis/NIR/SWIR spectrum. This can be achieved because the powered front refractive surface(103) enables balancing of the chromatic aberration through adjusting the lens refractive power, whereas the curved reflecting back mirror surface (102) has a constant power over the wavelength range, and the dispersion is adjusted by altering the wedge of the prism. This MWIR imaging spectrometer system is diffraction limited over the full wavelength range.

The diffraction grating (104,105) has the rulings immersed in a wedged prism of zinc selenide. The light enters through the curved prism front surface(105), is transmitted through the zinc selenide and then diffracted off rulings on the coated back surface(104), passing out through the curved front surface again. The grating can be diamond flycut with a dual-blazed profile to distribute the diffraction efficiency over this multi-octave wavelength range. The design uses a conventional grating with equally spaced straight rulings on a flat surface. The grating is cut on the plane back of a wedged prism, and the front refractive face of the prism has a rotational aspheric surface. The power of the asphere is chosen to provide an achromatic system together with the two barium fluoride lenses, reducing the chromatic longitudinal defocus from the detector, and with the aspheric terms correcting the system spherical aberration.

From the sapphire prism (102,103) and the zinc selenide grating (104,105) the dispersed light passes through the two barium fluoride lenses (106,107) and (109,110) to be focused through the cold blocking filter (111) and onto the detector. The asphericities and powers on the surfaces of the optical elements are chosen to minimize the optical aberrations and to correct the spectral and spatial distortions.

Referring to FIG. 2 the size of the system is 50 mm in the Y dimension, 20 mm in the X dimension and 120 mm in the Z dimension.

Baffles are inserted at select locations to control the stray light. The first lens is bent to produce a first surface with positive curvature, so that the reflection of the entrance beam off the first surface misses the grating, important because this undispersed beam is relatively intense. The grating is also tilted so that the reflection off the front surface misses the detector, ensuring that only the dispersed light from the grating reaches the detector.

TABLE 1

Optical Design Parameters

| Parameter | Value |
| --- | --- |
| f-number for complete entrance pupil (width and height) | 4 (square entrance pupil) |
| Input beam at slit from telescope | Telecentric |
| Detector format | 256 spatial × 256 spectral |
| Pixel size | 40 microns |
| VNIR 0.55 to 2.4 microns | dispersed over 228 spectral rows |
| VNIR f numbers | 4 in spatial direction |
| | 6 in spectral direction (nominal) |
| VNIR Performance | 80 percent circled energy <40 microns |
| MWIR 3.2 to 5.3 microns | dispersed over 28 spectral rows |
| MWIR f numbers | 4 in spatial direction |
| | 12 in spectral direction (nominal) |
| MWIR Performance | Diffraction limited |
| Spatial distortion: change in spatial mapping with wavelength (keystone) | <±0.1 pixel |
| Spectral distortion: spectral smile | <±0.1 pixel |
| Ghost level | <0.1% of primary image |

Table 1 shows that this design meets a number of difficult requirements for a refractive imaging spectrometer operating over such a large wavelength range. The spatial keystone distortion has been kept to less than ±0.1 pixels over the full wavelength range, enabling very good spectral correlation of the pixels at all wavelengths. This means that the spectrum from a single point in the entrance slit wanders from the center of a column of pixels by less than ±4 microns. Note that this parameter also includes the transition between the visible/short wave infrared and the mwir sections of the detector, enabling instantaneous spatial correlation between the spectra in the visible/swir and the mwir regions.

Since the pupil is split between the two spectrometer sections, their f-numbers in the vertical direction are reduced, with the ratio of the f-numbers chosen to balance the signal received at the detector for the two wavelength regions.

The spectral smile, which is the curvature of the slit image at each wavelength on the detector, has been kept to less than ±0.1 pixels. Correcting the spectral slit curvature, and the spatial mapping distortion with wavelength, to less than plus or minus one tenth of a pixel ensures that the images do not have to be resampled to correct for these distortions. The image quality is also good over the full wavelength range: diffraction limited over the MWIR and with the eighty percent spot diameters less than the pixel dimension over the Vis/NIR/SWIR wavelengths.

Figure 3:
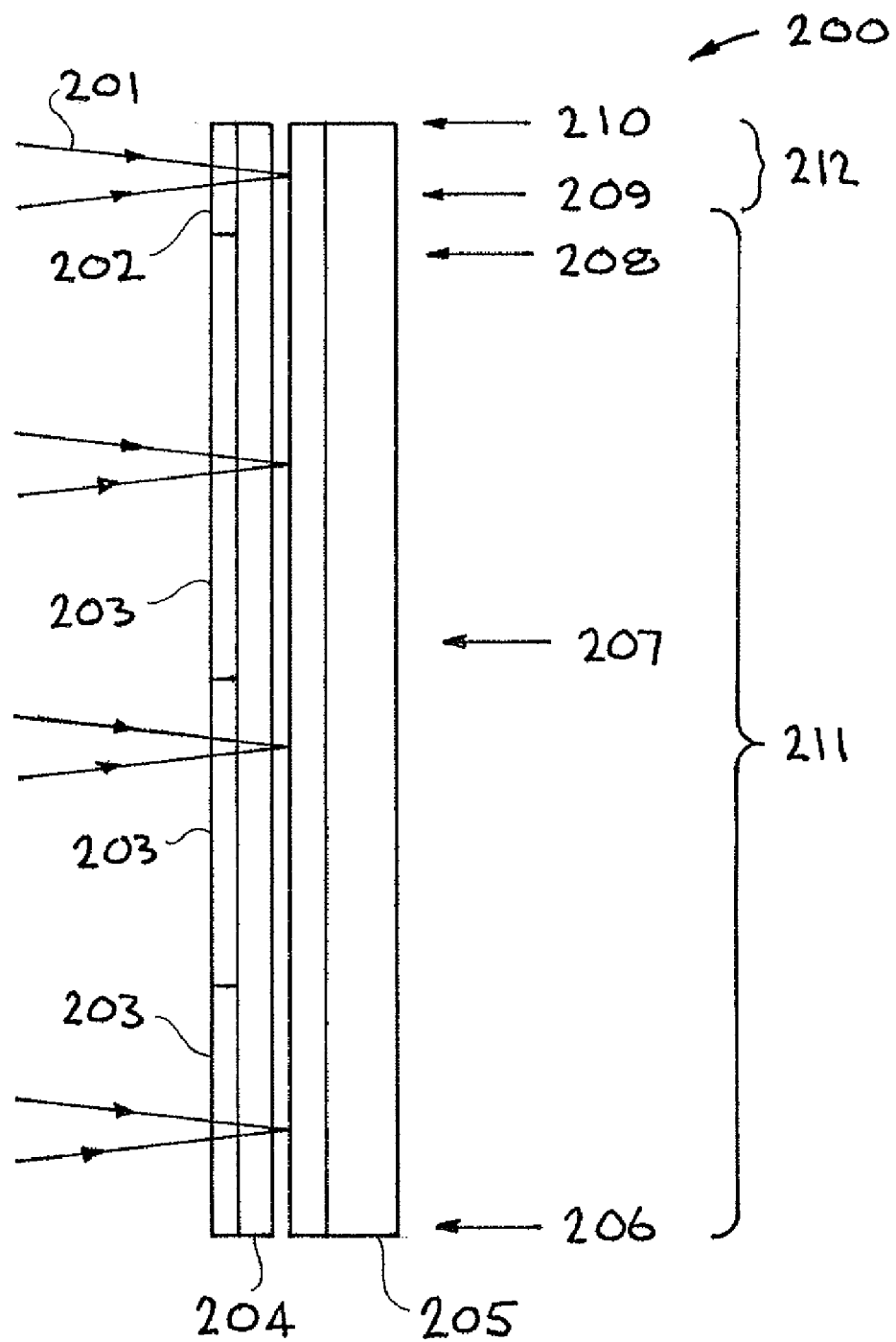
FIG. 3 illustrates a detailed view of the cold filter and dual waveband detector in the embodiment of the dual waveband spectrometer.

To prevent spectral contamination from the different spectral orders there are cooled wavelength filters in front of the detector. FIG. 3. shows the detail of the cold filter (204) and the dual waveband detector (205) in the spectrometer. The light (201) from the dispersed spectrums passes through the cold filters before reaching the detector. The visible/swir detector region consists of 228 spectral rows (211) with the 0.55 micron wavelength imaged at position (206) the 1.474 micron wavelength at (207) and the 2.4 micron wavelength at (208). The three regions of the cold filter (203) have their spectral band-passes designed to eliminate order overlap between the different spectra from the grating, since the spectrometer operates over multiple octaves. In addition, the cold bandpass filter section (203) adjacent to the MWIR detector rows blocks the longer wavelength MWIR light from getting through to the SWIR detector section.

The MWIR light from the sapphire prism passes through the MWIR bandpass filter (202) and is dispersed onto the 28 MWIR sensitive rows of the detector (212). The dispersion direction is reversed from that of the grating so that the 3.2 micron light is at (210) and the 5.3 micron light at (209). This ensures that wavelengths longer than 5.3 microns falling on the visible/SWIR portion of the detector are blocked by the bandpass filters.

This invention solves the problem of utilizing a single detector with a combined visible/near infrared/short-wavelength infrared (Vis/NIR/SWIR) spectrometer and a mid-wave infrared (MWIR) spectrometer. The invention takes advantage of detector developments, where rows of MWIR sensitive pixels are adjacent to rows of visible/near infrared/short-wavelength infrared pixels on a single substrate.

This compact dual waveband imaging spectrometer uses a single small cryogenic cooler, facilitating its use in small and medium manned and unmanned aerial vehicles for remote gas detection and detection of solids with characteristic spectral features in the Vis/NIR/SWIR and MWIR regimes.

Figure 4:
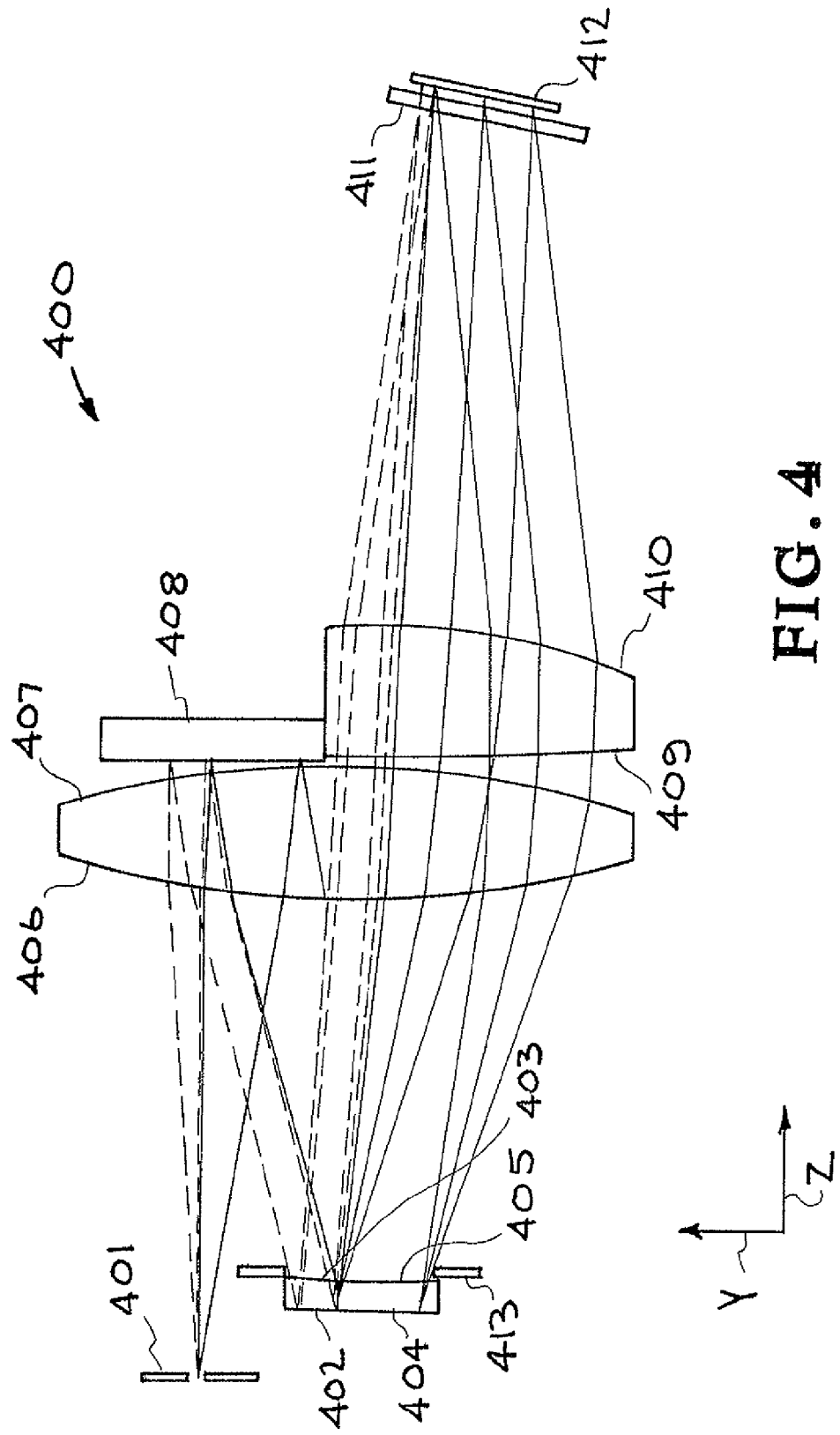
FIG. 4 illustrates a modification of the dual waveband imaging spectrometer illustrated in FIG. 1 wherein the dispersing prism is replaced by a second immersion grating.

Referring now to FIG. 4, another embodiment of a dual waveband imaging spectrometer constructed in accordance with the present invention is illustrated that is a modification of the dual waveband imaging spectrometer illustrated in FIG. 1 wherein the dispersing prism is replaced by a second immersion grating. This embodiment of a dual waveband imaging spectrometer constructed in accordance with the present invention is designated generally by the reference numeral 400.

The light travels from the entrance slit (401) of the spectrometer to the first barium fluoride dioptric lens refracting through the front (406) and back (407) of the lens of the lens, then reflecting from the curved mirror (408) behind the lens, so that the light traverses back through the lens. The light then travels to the zinc selenide grating (404,405) and the immersion grating with a reflective coating (402,403) with the cold stop (413). From the immersion grating with a reflective coating (402,403) and the zinc selenide grating (404,405), the dispersed light passes through the two barium fluoride lenses (406,407) and (409,410) to be focused through the cold filter (411) and onto the detector.

This embodiment of a dual waveband imaging spectrometer constructed in accordance with the present invention 400 provides a dual waveband imaging spectrometer including an entrance slit for transmitting light, a first dioptric lens, a mirror, a first immersion grating with a reflective coating, a second immersion grating with a reflective coating, a second dioptric lens, and a dual waveband detector; the entrance slit, the first dioptric lens, the mirror, the first immersion grating, the second immersion grating, the second dioptric lens, and the detector array positioned wherein the entrance slit transmits light to the first dioptric lens, which refracts light to the mirror, which reflects light back through the first dioptric lens to the first immersion grating and the second immersion grating, and dispersed dual waveband light is focused through the first dioptric lens and the second dioptric lens to the dual waveband detector.

Figure 5:
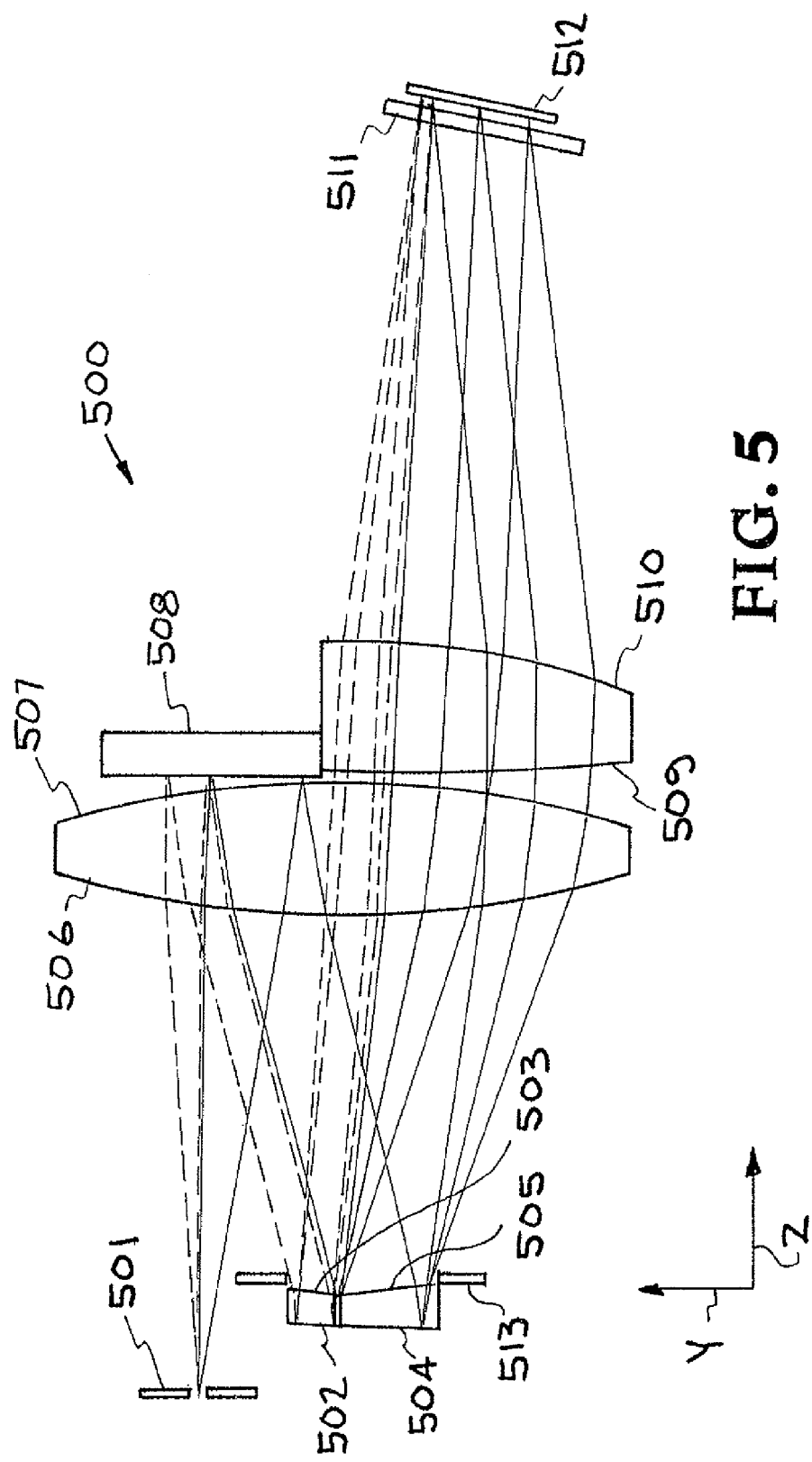
FIG. 5 illustrates a modification of the dual waveband imaging spectrometer illustrated in FIG. 1 wherein the immersion grating is replaced by a second dispersing prism.

Referring now to FIG. 5, another embodiment of a dual waveband imaging spectrometer constructed in accordance with the present invention is illustrated that is a modification of the dual waveband imaging spectrometer illustrated in FIG. 1 wherein the immersion grating is replaced by a second dispersing prism. This embodiment of a dual waveband imaging spectrometer constructed in accordance with the present invention is designated generally by the reference numeral 500.

The light travels from the entrance slit (501) of the spectrometer to the first barium fluoride dioptric lens refracting through the front (506) and back (507) of the lens of the lens, then reflecting from the curved mirror (508) behind the lens, so that the light traverses back through the lens. This embodiment of a dual waveband imaging spectrometer constructed in accordance with the present invention 500 provides a dual waveband imaging spectrometer including an entrance slit for transmitting light, first dioptric lens, a mirror, a first dispersing prism with a reflective coating, an second dispersing prism with a reflective coating, a second dioptric lens, and a dual waveband detector; the entrance slit, the first dioptric lens, the mirror, the dispersion prism, the immersion grating, the second dioptric lens, and the detector array positioned wherein the entrance slit transmits light to the first dioptric lens, which refracts light to the mirror, which reflects light back through the first dioptric lens to the first dispersing prism and the second dispersing prism, and dispersed dual waveband light is focused through the first dioptric lens and the second dioptric lens to the dual waveband detector.

Figure 6:
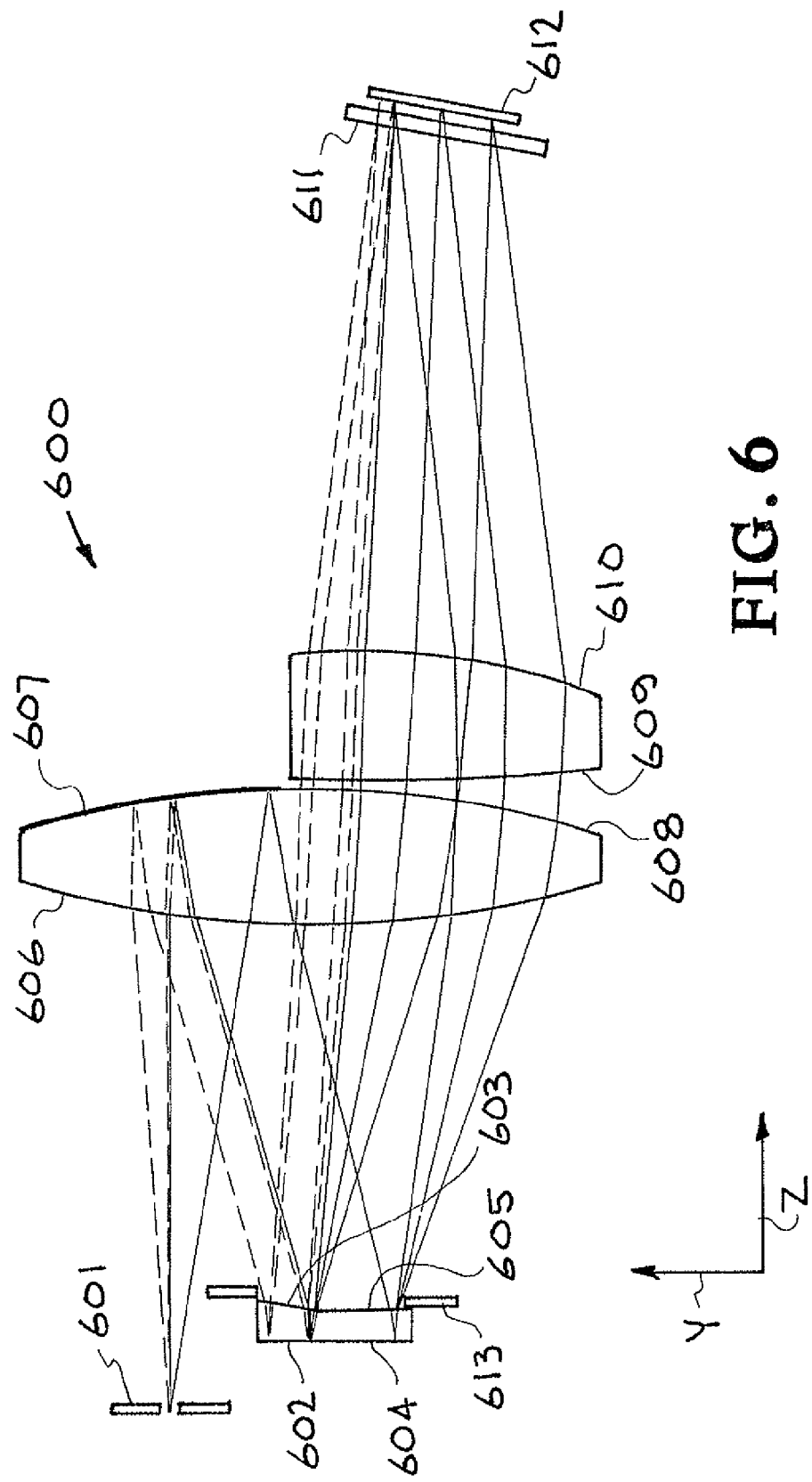
FIG. 6 illustrates a modification of the dual waveband imaging spectrometer illustrated in FIG. 1 wherein the mirror is eliminated by changing said first dioptric lens into a catadioptric lens, with top part of its back surface covered with a reflective coating.

Referring now to FIG. 6, another embodiment of a dual waveband imaging spectrometer constructed in accordance with the present invention is illustrated that is a modification of the dual waveband imaging spectrometer illustrated in FIG. 1 wherein the need the mirror is eliminated by changing said first dioptric lens into a catadioptric lens, with top part of its back surface covered with a reflective coating. The dispersed light would then go through the lower uncoated part of the said catadioptric lens onto the said second dioptric lens, and then onto the said detector. This embodiment of a dual waveband imaging spectrometer constructed in accordance with the present invention is designated generally by the reference numeral 600.

The light travels from the entrance slit (601) of the spectrometer to the first barium fluoride dioptric lens refracting through the front (606) and back (607) of the lens of the lens so that the light traverses back through the lens. The light then travels to the zinc selenide grating (604,605) and the grating with a reflective coating (602,603) with the cold stop (613). From the grating with a reflective coating (602,603) and the zinc selenide grating (604,605), the dispersed light passes through the two barium fluoride lenses (606,607) and (609, 610) to be focused through the cold filter (611) and onto the detector.

This embodiment of a dual waveband imaging spectrometer constructed in accordance with the present invention 600 provides a dual waveband imaging spectrometer including an entrance slit for transmitting light, a catadioptric lens having a back surface with a top part and a lower part, wherein the top part of the back surface is covered with a reflective coating, a dispersing prism with a reflective coating, an immersion grating with a reflective coating, a second dioptric lens, and a dual waveband detector; the entrance slit, the catadioptric lens, the mirror, the dispersion prism, the immersion grating, the second dioptric lens, and the detector array are positioned wherein the entrance slit transmits light to the catadioptric lens, which refracts light back through the catadioptric lens to the dispersing prism and the immersion grating, and dispersed dual waveband light is focused through the catadioptric lens and the second dioptric lens to the dual waveband detector.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. This invention can be adapted to different spectral regions by suitable choice of refractive and reflective materials, and with different detector arrays. This application covers all modifications, equivalents, and alternatives falling within the spirit and scope of the invention as defined by the following appended claims.

The invention claimed is:

1. A dual waveband imaging spectrometer, comprising:
an entrance slit for transmitting light,
a first dioptric lens,
a mirror,
a dispersing prism with a reflective coating,
an immersion grating with a reflective coating,
a second dioptric lens, and
a dual waveband detector;
said entrance slit, said first dioptric lens, said mirror, said dispersion prism, said immersion grating, said second dioptric lens, and said detector array positioned wherein
said entrance slit transmits light to said first dioptric lens, which refracts light to said mirror, which reflects light back through said first dioptric lens to said dispersing prism and said immersion grating, and dispersed dual waveband light is focused through said first dioptric lens and said second dioptric lens to said dual waveband detector.

2. The dual waveband imaging spectrometer of claim 1 wherein said immersion grating includes a refractive face with curvature and disperses a wavelength, and wherein said curvature of said refractive face provides the necessary power to form an achromatic correction with the said dioptric lenses and over said wavelength range of the immersion grating.

3. The dual waveband imaging spectrometer of claim 2 wherein said immersion grating includes a focal surface and wherein said curvature of the said dispersion grating is adjusted to provide the correct power to form an achromatic correction with the said dioptric lenses, and said curvature of the reflective surface positions the focal surface coincident with that from said immersion grating.

4. A dual waveband imaging spectrometer, comprising:
an entrance slit for transmitting light,
a first dioptric lens,
a mirror,
a first immersion grating with a reflective coating,
a second immersion grating with a reflective coating,
a second dioptric lens, and
a dual waveband detector;
said entrance slit, said first dioptric lens, said mirror, said first immersion grating, said second immersion grating, said second dioptric lens, and said detector array positioned wherein
said entrance slit transmits light to said first dioptric lens, which refracts light to said mirror, which reflects light back through said first dioptric lens to said first immersion grating and said second immersion grating, and dispersed dual waveband light is focused through said first dioptric lens and said second dioptric lens to said dual waveband detector.

5. A dual waveband imaging spectrometer, comprising:
an entrance slit for transmitting light,
a first dioptric lens,
a mirror,
a first dispersing prism with a reflective coating,
an second dispersing prism with a reflective coating,
a second dioptric lens, and
a dual waveband detector;
said entrance slit, said first dioptric lens, said mirror, said first dispersing prism, said second dispersing prism, said second dioptric lens, and said detector array positioned wherein
said entrance slit transmits light to said first dioptric lens, which refracts light to said mirror, which reflects light back through said first dioptric lens to said first dispersing prism and said second dispersing prism, and dispersed dual waveband light is focused through said first dioptric lens and said second dioptric lens to said dual waveband detector.

6. A dual waveband imaging spectrometer, comprising:
an entrance slit for transmitting light,
a catadioptric lens having a back surface with a top part and a lower part, wherein said top part of said back surface is covered with a reflective coating,
a dispersing prism with a reflective coating,
an immersion grating with a reflective coating,
a second dioptric lens, and
a dual waveband detector;
said entrance slit, said catadioptric lens, said mirror, said dispersion prism, said immersion grating, said second dioptric lens, and said detector array are positioned wherein
said entrance slit transmits light to said catadioptric lens, which reflects light from its said back surface with its said top part reflective coating, back through said catadioptric lens to said dispersing prism and said immersion grating, and dispersed dual waveband light is focused through said catadioptric lens and said second dioptric lens to said dual waveband detector.

* * * * *